(12) United States Patent
Moth et al.

(10) Patent No.: US 10,360,135 B2
(45) Date of Patent: Jul. 23, 2019

(54) PRIVILEGE TEST AND MONITORING

(71) Applicant: Microsoft Technology Licensing, LLC, Redmond, WA (US)

(72) Inventors: Andreas Leon Aagaard Moth, Smoerum (DK); Boaz Lev, Charlottenlund (DK); Predrag Borivoje Maricic, Copenhagen (DK); Thomas Andersen, Charlottenlund (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 15/171,936

(22) Filed: Jun. 2, 2016

(65) Prior Publication Data

US 2017/0286265 A1    Oct. 5, 2017

Related U.S. Application Data

(60) Provisional application No. 62/316,057, filed on Mar. 31, 2016.

(51) Int. Cl.
*G06F 11/36* (2006.01)
*G06F 21/62* (2013.01)

(52) U.S. Cl.
CPC ...... *G06F 11/3644* (2013.01); *G06F 11/3672* (2013.01); *G06F 11/3688* (2013.01); *G06F 21/6218* (2013.01)

(58) Field of Classification Search
CPC ............ G06F 11/3644; G06F 11/3688; G06F 21/6218; G06F 11/3672
USPC .................................................. 717/124–135
See application file for complete search history.

(56) References Cited

U.S. PATENT DOCUMENTS

| | | | | |
|---|---|---|---|---|
| 5,948,097 A | * | 9/1999 | Glew | G06F 9/4486 712/220 |
| 6,353,820 B1 | * | 3/2002 | Edwards | G06F 16/2272 707/696 |
| 6,976,023 B2 | * | 12/2005 | Chen | G06F 21/10 707/785 |
| 7,310,822 B2 | | 12/2007 | LaMacchia et al. | |

(Continued)

FOREIGN PATENT DOCUMENTS

| | | |
|---|---|---|
| EP | 2073138 A1 | 6/2009 |
| GB | 2483907 | 3/2012 |

OTHER PUBLICATIONS

Centonze, et al., "Combining Static and Dynamic Analysis for Automatic Identification of Precise Access-Control Policies", In Proceedings of Twenty-Third Annual Computer Security Applications Conference, Dec. 10, 2007, pp. 292-301.

(Continued)

*Primary Examiner* — Andrew M. Lyons
(74) *Attorney, Agent, or Firm* — Workman Nydegger

(57) ABSTRACT

Testing code. A method includes identifying in code being executed on a computing system a specification of a permission set. The method further includes dynamically, as the code is running changing a permission level of the computing system to match the permission set. The method further includes executing code at the computing system within the permissions in the permission set. The method further includes during execution, for actions performed in the execution, determining if the permission set includes sufficient permissions for the action to be performed.

20 Claims, 9 Drawing Sheets

(56) References Cited

U.S. PATENT DOCUMENTS

| | | | |
|---|---|---|---|
| 7,454,791 B1* | 11/2008 | Godwin | G06F 21/577 726/25 |
| 7,743,423 B2* | 6/2010 | Lange | G06F 21/53 713/193 |
| 8,006,233 B2 | 8/2011 | Centonze et al. | |
| 8,024,564 B2 | 9/2011 | Bassani et al. | |
| 8,321,837 B2 | 11/2012 | Broberg et al. | |
| 8,601,539 B1 | 12/2013 | Bobel | |
| 9,053,228 B1* | 6/2015 | Bienkowski | G06F 3/013 |
| 9,665,465 B1* | 5/2017 | Jain | G06F 21/629 |
| 2003/0041267 A1* | 2/2003 | Fee | G06F 21/6209 726/4 |
| 2005/0091520 A1* | 4/2005 | Khan | G06F 11/3648 713/194 |
| 2006/0048099 A1 | 3/2006 | Templin et al. | |
| 2006/0277594 A1* | 12/2006 | Chiavegatto, Jr. | G06F 21/6218 726/2 |
| 2007/0056026 A1 | 3/2007 | Britton et al. | |
| 2007/0174899 A1* | 7/2007 | Broberg | G06F 21/6218 726/4 |
| 2007/0261124 A1 | 11/2007 | Centonze et al. | |
| 2007/0277222 A1 | 11/2007 | Pouliot | |
| 2008/0313730 A1* | 12/2008 | Iftimie | G06F 21/40 726/17 |
| 2009/0094667 A1* | 4/2009 | Habeck | G06F 21/6218 726/1 |
| 2009/0260056 A1 | 10/2009 | Garg et al. | |
| 2009/0300713 A1* | 12/2009 | Sakai | G06F 9/468 726/1 |
| 2010/0043048 A1* | 2/2010 | Dolby | G06F 21/53 726/1 |
| 2010/0325738 A1 | 12/2010 | Bader et al. | |
| 2012/0090037 A1 | 4/2012 | Levit | |
| 2012/0159566 A1* | 6/2012 | Hrastnik | G06F 21/6218 726/1 |
| 2012/0291103 A1* | 11/2012 | Cohen | G06F 21/6218 726/4 |
| 2013/0024929 A1* | 1/2013 | Abraham | G06F 21/53 726/16 |
| 2013/0232474 A1* | 9/2013 | Leclair | G06F 9/44 717/134 |
| 2013/0246743 A1 | 9/2013 | Farrell et al. | |
| 2013/0346979 A1* | 12/2013 | Nightingale | G06F 8/456 718/100 |
| 2014/0189852 A1 | 7/2014 | Swingler et al. | |
| 2015/0135170 A1* | 5/2015 | Murray | G06F 9/45516 717/148 |
| 2015/0156202 A1* | 6/2015 | Clark | H04L 63/10 726/4 |

OTHER PUBLICATIONS

International Search Report and the Written Opinion issued in PCT Patent Application No. PCT/US2017/024399 dated Jun. 1, 2017.

* cited by examiner

Permissions ▼

General

Role ID: 0365 BASIC

Show: Only In Permission Set

Add Read Permission to Related Tables: ☐

| Object Type | Object ID | Object Name | Read Permission | Insert Permission | Modify Permission | Date Permission |
|---|---|---|---|---|---|---|
| Table Data | 3 | Payment Terms | Yes | | | |
| Table Data | 4 | Currency | Yes | | | |
| Table Data | 5 | Finance Charge Terms | Yes | | | |
| Table Data | 6 | Customer Price Group | Yes | | | |
| Table Data | 7 | Standard Text | Yes | Yes | Yes | Yes |
| Table Data | 8 | Language | Yes | Yes | Yes | Yes |
| Table Data | 9 | Country/Region | Yes | Yes | Yes | Yes |
| Table Data | 10 | Shipment Method | Yes | | | |
| Table Data | 13 | Salesperson/Purchaser | Yes | | | |
| Table Data | 14 | Location | Yes | | | |
| Table Data | 15 | G/L Account | Yes | | | |

*Figure 1*

```
[Test]
[HandlerFunctions(ConfirmHandlerTrue)]
PROCEDURE SaveStandardJournal01();
VAR
    GenJournalBatch@1005 : Record 232;
    GenJournalLine@1000 : Record 81;
    StandardGeneralJournal@1001 : Record 750;
BEGIN
    // Test create General Journal Lines and Save them as Standard Journal.

// 1. Setup: Create General Journal Batch, General Journal Lines and Standard Journal Code.
    Initialize;
    CreateGeneralJournalBatch(GenJournalBatch);
    CreateGeneralJournalLines(GenJournalLine,GenJournalBatch);

// 2. Exercise: Save General Journal Lines as Standard Journal.
    LibraryLowerPermissions.SetJournalsPost;
    CreateSaveStandardJournal(StandardGeneralJournal,GenJournalBatch);

// 3. Verify: Verify correct number of Standard General Journal lines created.
    VerifyStandardJournalLines(GenJournalLine,StandardGeneralJournal.Code);
END;
```

| | HOME | ACTIONS | | | | | |
|---|---|---|---|---|---|---|---|
| Allow Read ▼ | Allow Insertion ▼ | Allow Modification ▼ | Allow Deletion ▼ | Allow Execution ▼ | Allow All ▼ | | |
| Read Permission | Insert Permission | Modify Permission | Delete Permission | Execute Permission | All Permission | Start Record Permissions | Stop |

Permissions ▼

General

Role ID: TEST PERMISSION SET

Show: Only in Permission Set

Add Read Permission to Related Tables: ☐

Type to Filter (F3) | Object Type ▼ | →

No Filters Applied

| Object Type | Object ID ▲ | Object Name | Read Permission | Insert Permission | Modify Permission | Delete Permission | Execute Permission | Security Filter |
|---|---|---|---|---|---|---|---|---|
| Codeunit | 10201 | Transfer Custom Fields | | | | | Yes | |
| Codeunit | 99000830 | Office Host Provider Test | | | | | Yes | |
| Codeunit | 99000831 | Create Reservation Entry | | | | | Yes | |
| Codeunit | 99000832 | Reservation Engine Mgt. | | | | | Yes | |
| Page | 43 | Sales Invoices | | | | | Yes | |
| Page | 47 | Lines | | | | | Yes | |
| Page | 132 | Postal Sales Invoice | | | | | Yes | |
| Page | 133 | Lines | | | | | Yes | |
| Query | 21 | Cust. Ledg. Entry Remain. Amt. | | | | | Yes | |
| Query | 1501 | Workflow Instance | | | | | Yes | |
| Query | 1502 | Workflow Definition | | | | | Yes | |

OK

PRIVILEGE TEST AND MONITORING

CROSS-REFERENCE TO RELATED APPLICATIONS

This application claims the benefit of and priority to U.S. Provisional Patent Application Ser. No. 62/316057 filed on Mar. 31, 2016 and entitled "Privilege Test and Monitoring," which application is expressly incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Background and Relevant Art

Computers and computing systems have affected nearly every aspect of modern living. Computers are generally involved in work, recreation, healthcare, transportation, entertainment, household management, etc.

Computer systems often support different scenarios and user roles with each user having appropriate permissions and potentially a customized environment. User accounts enable individual users to log on to a computer system, while user groups are used to manage access to application areas for multiple users. Permission sets are assigned to user or user group accounts to determine which actions users can perform, as well as which application objects they can access.

When testing an application, it may be useful to determine that a particular user has sufficient permission o effectively perform their job functions. A typical way to test permissions is to have all dependencies for a test set-up beforehand and then execute the test that performs the action that the permissions gives access to. However, this approach results in a somewhat rigid test procedure. It can be also time consuming and expensive in cases where repeatability needs to be provided.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced at a computing system. The method includes acts for testing code. The method includes identifying in the code being executed on a computing system a specification of a permission set. The method further includes dynamically, as the code is running changing a permission level of the computing system to match the permission set. The method further includes executing code at the computing system within the permissions in the permission set. The method further includes during execution, for actions performed in the execution, determining if the permission set includes sufficient permissions for the action to be performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter, Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates a user interface that can he used to define permissions for a given permission set;

FIG. 2 illustrates a change of a permission set in sample code;

FIG. 3 illustrates additional sample code;

FIG. 4 illustrates code lines executed using permission sets, including aggregated permission sets;

FIG. 5 illustrates a user interface for implementing a permission recorder;

FIG. 6 illustrates additional actions using the user interface for implementing a permission recorder;

FIG. 7 illustrates additional actions using the user interface for implementing a permission recorder;

DETAILED DESCRIPTION

Figure 8:
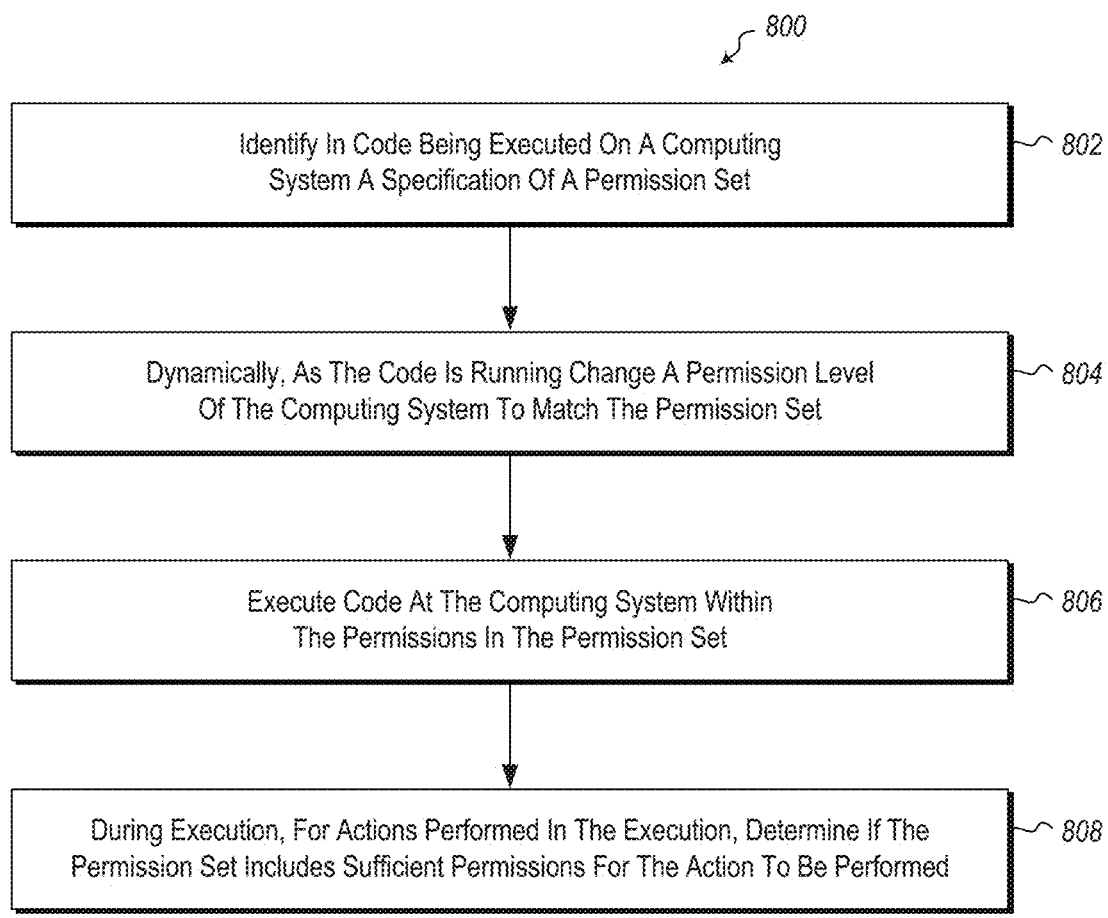
FIG. 8 illustrates a method of testing code.

Some embodiments described herein create dependencies as part of a test, using one permission set, but run the test under a different permission set. For example, one permission set could be used for a setup step and a different permission set for an execute step of the test. As such, embodiments can validate that the data needed for the execute step can be created from a certain permission set. This means if a user uses these two (or in other examples) permission sets they can execute the entire scenario including setup and execute. Embodiments may alternatively or additionally allow the use of multiple permission sets such that the combination of two permission sets allows a certain action or set of actions.

Illustrating additional details, embodiments can set privilege level at runtime. Changing privilege levels is implemented such that any line of test code can be executed using specific privileges as defined by permission sets. In case of missing privileges, in some embodiments, test execution is aborted and appropriate error message is provided.

Privilege level is based on permission sets. The functionality may be connected to system permission sets as the lowest privilege level that can be used. Embodiments can simulate real user activity where the minimum set of privileges that can be granted to user is defined by a permission set. This allows testing to be performed that is aligned to an application security system.

In one example, embodiments may be used in Microsoft Dynamics NAV available from Microsoft Corporation, of Redmond, Wash., which is designed to be a multiuser enterprise resource planning (ERP) system. Some embodiments of such systems support different scenarios, with each user having appropriate permissions and a customized environment. For example, user accounts enable individual users to log on to the. Microsoft Dynamics NAV, while user groups are used to manage access to application areas for multiple users. Permission sets are assigned to user or user group accounts to determine which actions users can perform, as well as which application objects they can access, Alternatively or additionally, some embodiments may implement what is referred to herein as a permission recorder. The permission recorder helps a user to identify missing permissions or to confirm that a user has sufficient permissions.

Embodiments may be implemented as a test library as a part of an application test framework. The library references a component responsible for setting specific privileges. For example, some embodiments may reference .Net assembly PermissionTestHelper (Microsoft.Dynamics.Nav.PermissionTestHelper), available from Microsoft Corporation, of Redmond, Wash., which is responsible to set specific privilege (permission set). Before a test is executed, the permission test helper is started, using the default/initial permission level desired for testing.

In some embodiments, a library exposes several functions to set and add all built in permission sets. To develop a test that will lower and/or elevate a permission set, an IT professional can reference the library for lowering permissions and set a specific permission set. Embodiments may be implemented where there is no need to reset permission set level after a test is executed as the test runner resets to a given default permission set, An example is now illustrated. FIG. 1 illustrates a user interface 100 that can be used to define permissions for a given permission set. In the illustrated example, a user may be given permissions selected from read, insert, modify, delete (and although not shown, execute—when an object is an executable object). In the illustrated example, the permissions can be assigned on an object basis.

Thus, FIG. 1 illustrates an identification of a permission set as illustrated at 102. FIG. 1 illustrates a set of objects illustrated at 104. FIG. 1 also illustrates an identification of permissions on a per object basis as illustrated at 106.

Examples are now illustrated and of lowering permission level at run time. FIG. 2 illustrates sample code which illustrates a simple change of a permission set. Code lines 28-43 are executed using a default permission level. Code line 44 changes the permission set such that code lines 45-48 are executed using a lower permission set (Journal Post permission set in this case), and thus lower permission level.

Figure 3:
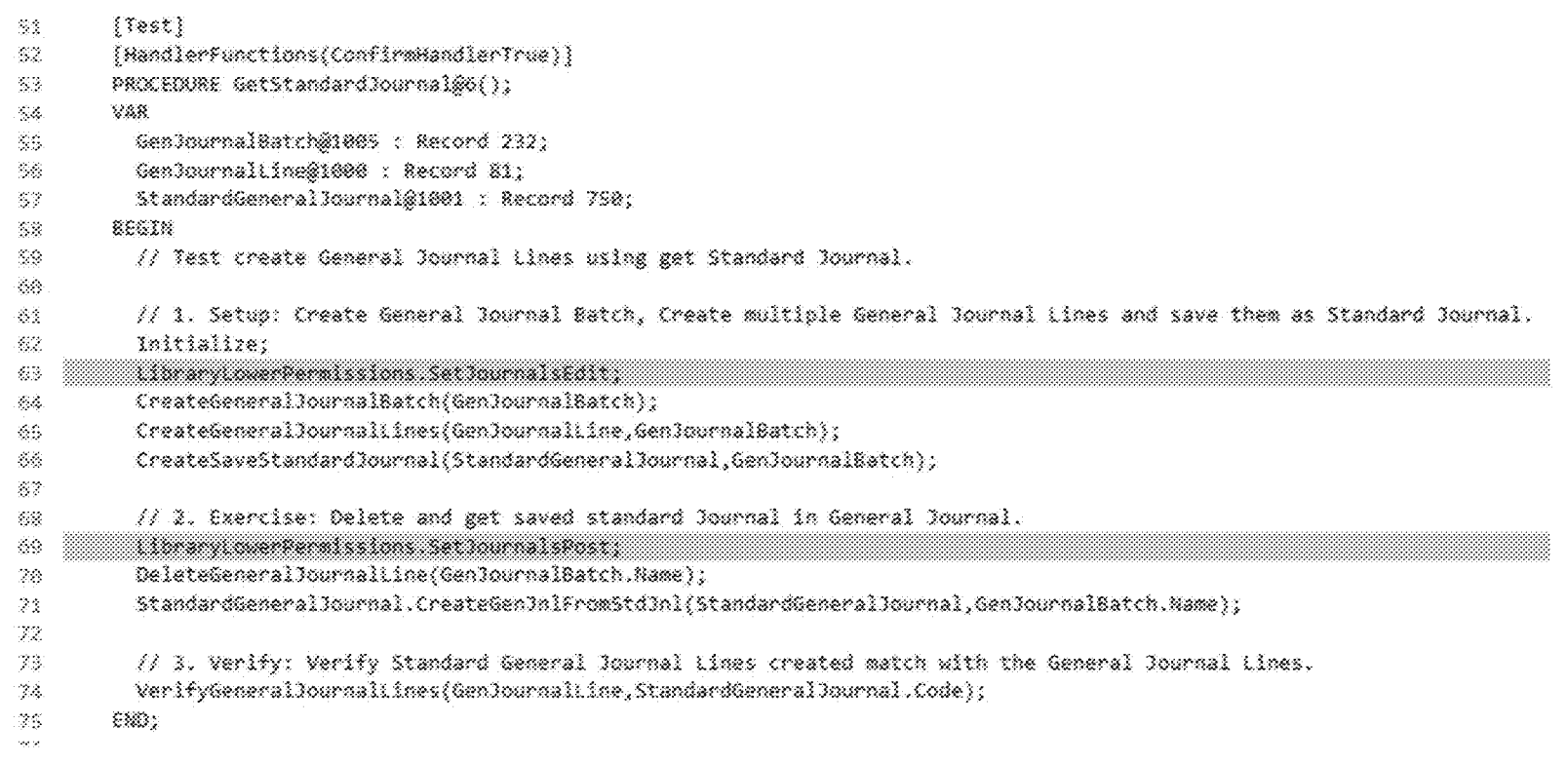

Embodiments can include the capability to change permission sets multiple times in one test. For example, FIG. 3 illustrates where code lines 59-62 are executed using a full permission set (e.g., the maximum level of permissions for a configured test). Code line 63 changes the permission set such that code lines 64-68 are executed using one permission set (JournalsEdit). Code line 69 changes the permission set such that code lines 70-74 are executed using a second permission set (JournalPost).

Figure 4:
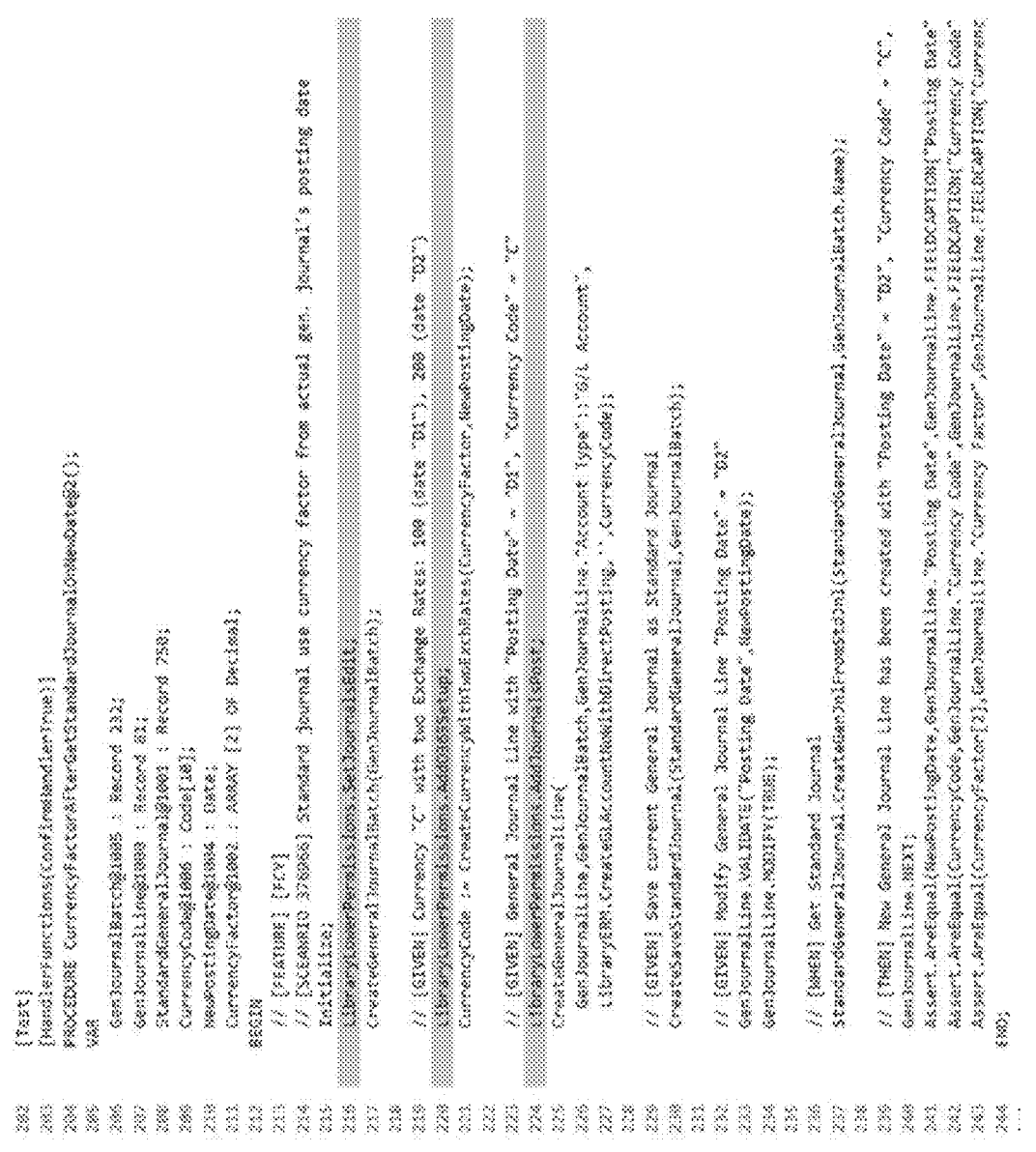

Embodiments can include the capability to execute using two or more permission sets together in one test. For example, FIG. 4 illustrates that code line 216 changes the permission set such that code lines 217-219 are executed using one permission set (JournalsEdit). Code line 220 changes the permission set such that code lines 221-223 are executed using an aggregated permission set (JournalsEdit, O365Setup). Code line 224 changes the permission set such that code lines 225-244 are executed using an aggregated permission set (JournalsEdit, O365Setup, JournalPost).

Some embodiments may determine that a given permission set does not include sufficient privileges to perform one or more actions specified in code. In some embodiments, in case of missing privileges, code execution is aborted and an appropriate error message is provided. In some embodiments, the error message may identify the missing privilege. This allows an administrator or other IT professional to determine if a privilege level should be adjusted by adding additional privileges to a privilege set. Alternatively or additionally, this may allow an administrator or professional to determine that a particular user should be added to a different group of users having a different permission set.

In an alternative embodiment, code execution may continue if the actions not able to be performed are not essential to continuing code execution. In this case, missing privileges can be noted and added to a list. Throughout the execution of a body of code, the various missing privileges can be added to the list which can then be provided to an administrator other IT professional to allow the administrator or IT professional to adjust the permission set for a user or to adjust which group to which a user belongs.

In some embodiments, permission levels may be adjusted dynamically as part of a security protection scheme. For example, embodiments may add a permission set for a user to allow some action by the user needing elevated privileges to be performed. After the action is performed, the permission set may be removed, such that the elevated privileges are no longer available and cannot be used to nefarious actors at the user's computer system.

In some embodiments, a library exposes several functions to set and add all built in permission sets. To develop a test or other scenario that will lower and/or elevate a permission set, an IT professional can reference the library for lowering permissions and set a specific permission set.

Embodiments may be implemented where there is no need to reset permission set level after a test is executed as the test runner resets to a given default permission set.

Alternatively, in other embodiments, permission levels can be reset manually.

Some embodiments may implement what is referred to herein as a permission recorder. The permission recorder helps a user to identify missing permissions or to confirm that a user has sufficient permissions.

Figure 5:
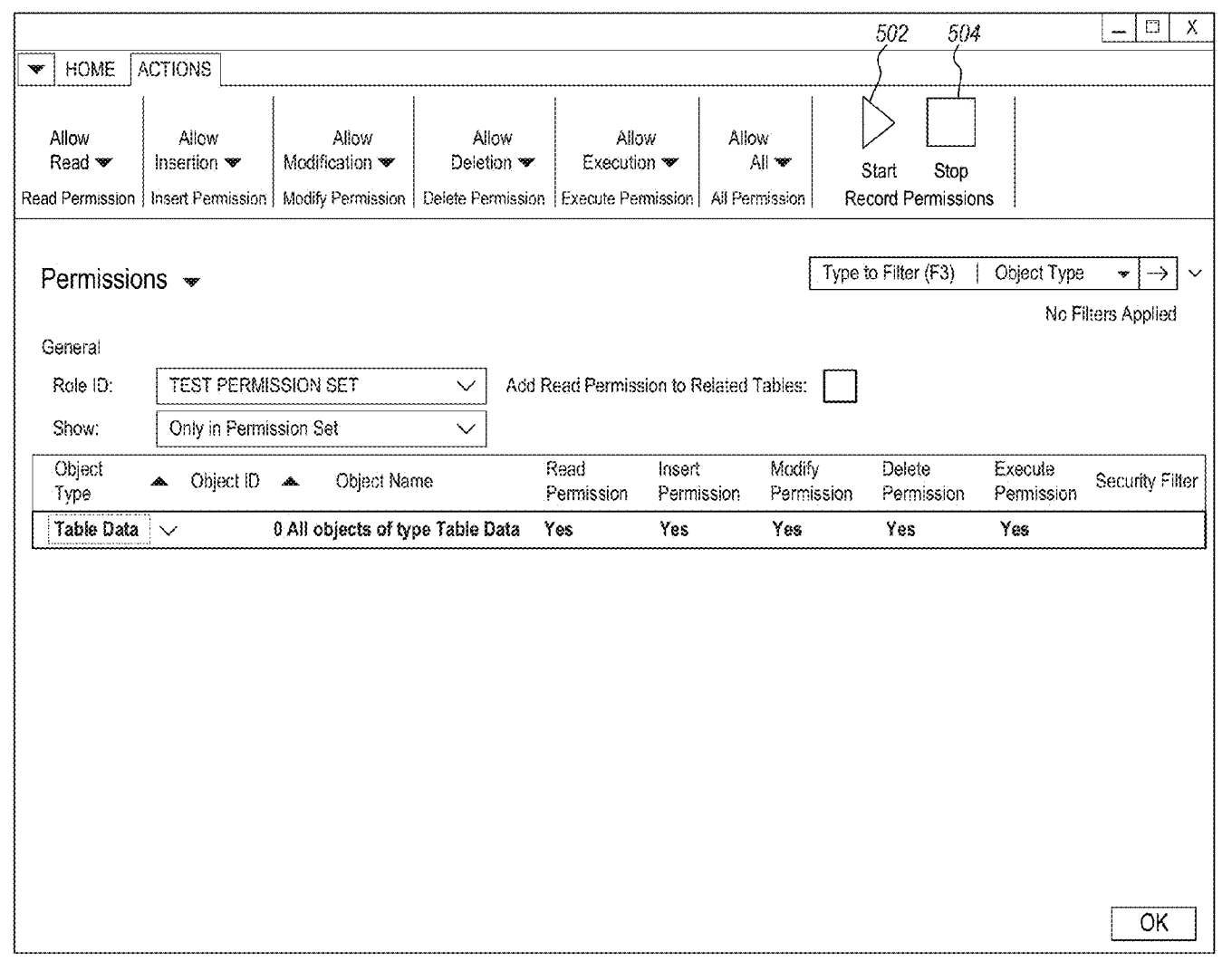
Figure 6:
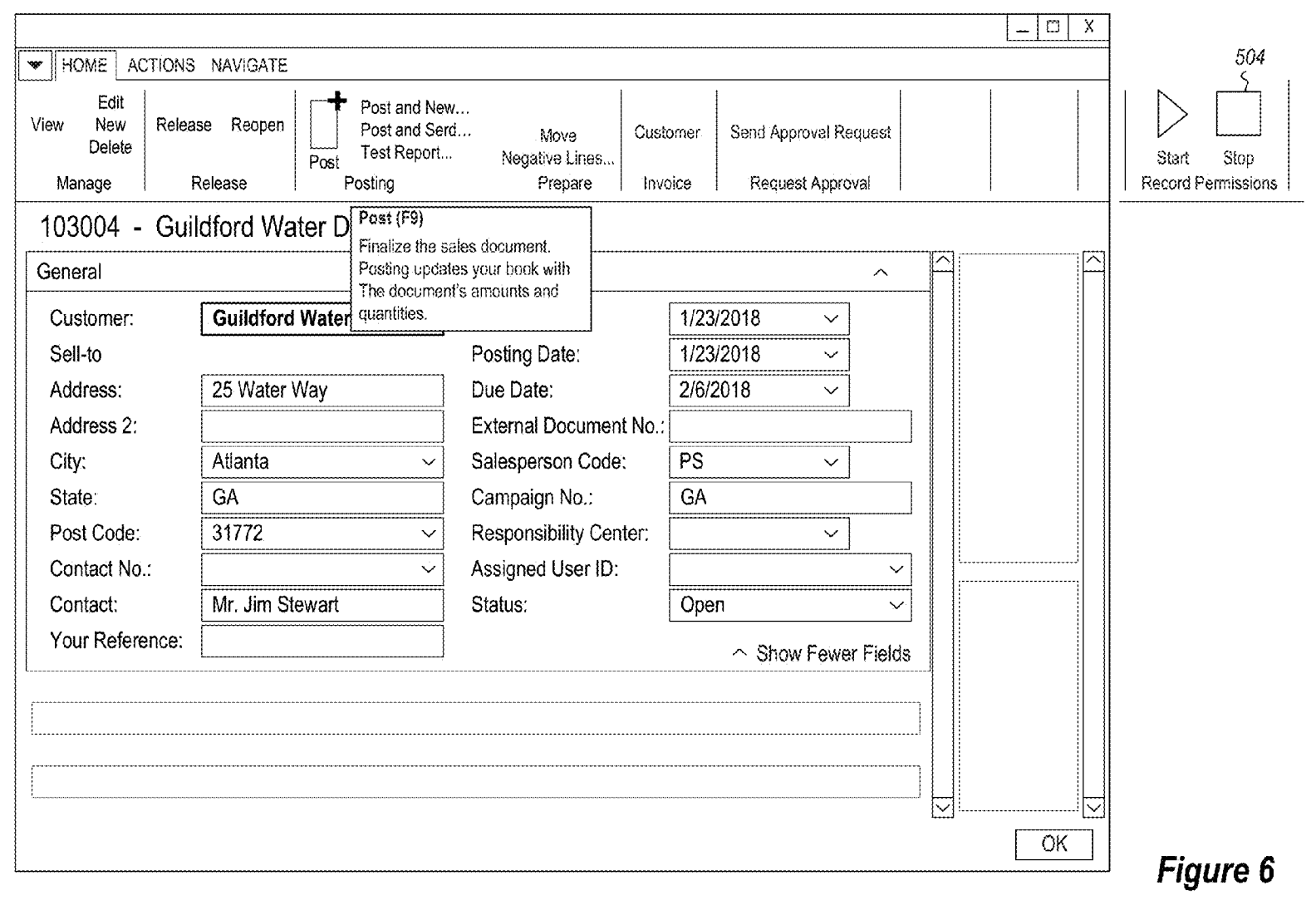

Referring now to FIGS. 5-7, an example of a permission recorder tool is illustrated. The tool is used for collecting permissions by performing scenario manually.

As illustrated in FIG. 5, a user clicks a start button 502 in a user interface 500. This signals the system to begin identifying and enumerating what permissions are needed for subsequent actions performed by a user.

The user then performs various actions. As illustrated in FIG. 6, for example, a user posts an invoice. After the user is done performing the actions for which the user desires to know what permissions are needed, then the user selects a stop button 504 which signals the system to cease identifying and enumerating permissions needed. As illustrated in FIG. 7, the system can then display to the user a table of permissions needed and, in some embodiments, whether or not the user has the needed permissions.

In particular, a user can enable the permission recorder prior to attempting to perform various actions. The user may have a certain permission set. The permission recorder can identify if the user is able to perform desired actions with the given permission set. If the user is unable to perform a given action using the given permission set, the permission recorder can identify what permissions are needed to perform the given action. With the permission recorder it is possible to identify missing privileges just by performing actions. While the user performs actions the permission recorder will record which permissions are needed and at the end show a list of these which can be used to update an existing permission set to enable performing the actions or to create an entirely new permission set from scratch.

This permission recorder can also be used as a monitor to test for permissions. A user can simply start the monitor before executing a test. In some embodiments, on every permission check the permission recorder will determine if a user has permissions for the actions in the test with the permission set defined in-code. If the needed permission is missing, this missing permission will be added to a list and allow the application to continue. Once the test finishes, all missing permissions are reported.

One advantage of such a system is that now all the missing permissions are visible and there is no need to continuously re-run the test, each with different permission sets defined, to find all missing permissions. A user can then identify from the list of missing permissions how much work there is in enabling an action for a permission set.

Thus, for example, when creating a new scenario, a user is able to collect all necessary permissions using the permission recorder, which makes permission set creation faster and easier. Thus, a system can be implemented that can, not only test permissions, but also collect missing permissions.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 8, a method 800 is illustrated. The method 800 includes acts for testing code. The method 800 includes identifying in code being executed on a computing system a specification of a permission set (act 802). For example FIG. 2 illustrates specification of a permission set at line 44. FIG. 3 illustrates specification of a permission sets at line 63 and at line 69. FIG. 4 illustrates specification of permission sets at lines 216, 220 and 224.

The method 800 further includes dynamically, as the code is running changing a permission level of the computing system to match the permission set (act 804). Thus a computing system running the code will have its permission level changed to the specified permission set.

The method 800 further includes executing code at the computing system within the permissions in the permission set (act 806). For example, as illustrated above in FIG. 2, lines 45-49 are executed using the specified permission set.

The method 800 further includes during execution, for actions performed in the execution, determining if the permission set includes sufficient permissions for the action to be performed (act 808).

The method 800 may be practiced where embodiments use alternative permission sets for different sets of functions. FIG. 3 illustrates an example where different permission sets are used for different functions.

The method 800 may further include iteratively using different permission sets for the same set of code. For example, embodiments may execute the same code, but using different permission sets. This may be done by using a loop where each iteration of the loop first executes code specifying a different permission set. Alternatively or additionally, this may be done by duplicating code to be tested and for each duplication, specifying a different permission set.

The method 800 may further include identifying that sufficient permissions are not included in the permission set to perform a given function, and as a result identifying the needed permission and specifying that permission to a user. In some environments, this could be identified to a user in real time as it is identified that the permissions are not sufficient to perform some action. Alternatively or additionally, embodiments may compile a list of permissions which can be later presented to a user to identify permissions needed to perform actions. In some embodiments, the permissions may be correlated to actions in the list to allow the user to identify what actions could not be performed based on particular missing permissions.

The method 800 may further include defining the permission set. For example, FIG. 1 illustrates a user interface that can be used by a user to cause a computing system to define one or more permissions sets.

The method 800 may further include identifying in the code a new permission set defined in the code, and dynamically as the code is running change a permission level to match the new permission set. For example, FIG. 3 illustrates an embodiment where a new permission set is defined which can be identified in the code and changed as the code is running to change a permission level. In this way, the code is executed under different permission sets. As will be illustrated below, in some embodiments, different portions of the code may be run under different permission sets. In other embodiments, the same portions of code may be run under different permission sets.

Figure 9:
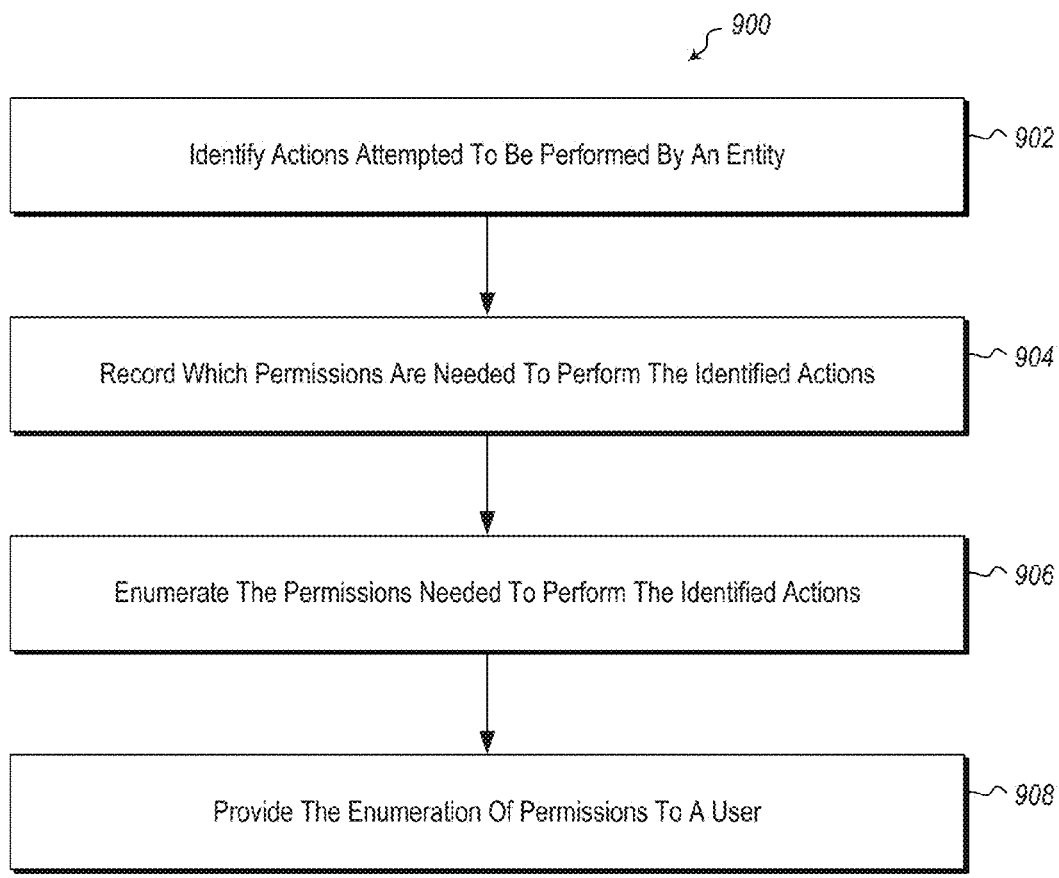
FIG. 9 illustrates a method of recording permissions.

Referring now to FIG. 9, a method 900 is illustrated The method 900 includes acts for identifying missing privileges. The method includes identifying actions attempted to performed by an entity (act 902).

The method 900 further includes recording which permissions are needed to perform the identified actions (act 904).

The method 900 further includes enumerating the permissions needed to perform the identified actions (act 906).

The method 900 further includes providing the enumeration of permissions to a user (act 908).

The method 900 may he practiced where recording which permissions are needed comprises at each individual action determining if the entity has permission. If the entity has the permissions, embodiments can note that the permissions are available. Alternatively or additionally, if the entity does not have the permissions, embodiments can note which permissions are missing to perform some action. Embodiments can then provide a list of actions and which permissions were used to perform the actions and/or which permissions are needed to perform the actions.

Embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e,g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to test code, including instructions that are executable to configure the computer system to perform at least the following:
      begin executing code to be tested on a computing system, wherein the code being executed on the computing system is a body of code received by the computing system, and including instructions received from a developer of the code, the instructions specifying one or more permission sets, the instructions being derived from a library that exposes functions to set built in permission sets;
      execute a first portion of the code using a first permission level for permissions specified in a first permission set;
      then identify an instruction, the instruction being included in the code received from the developer being executed on the computing system, the instruction specifying a second permission set;
      dynamically, as the code is running, execute the instruction having the specified second permission set to change the computing system to a second permission level to match the specified second permission set;
      execute a second portion of the code at the computing system at the second permission level, such that the code being executed on the computing system is run under different permission levels by executing permission level changing instructions in the code to be tested itself; and during execution, for an action to be performed in the execution of the code, determine if the specified second permission set includes sufficient permissions for the action to be performed.

2. The system of claim 1, wherein the one or more computer-readable media further have stored thereon instructions that are executable by the one or more processors to configure the computer system to determine that privileges are missing for the action to be performed, and as a result, abort executing the code and provide an error message.

3. The system of claim 1, wherein the one or more computer-readable media further have stored thereon instructions that are executable by the one or more processors to configure the computer system to determine that privileges are missing for the action to be performed, but continue executing the code as a result of determining that the action not able to be performed is not essential to continuing code execution, and add identified missing privileges to a list that can be provided to a user.

4. The system of claim 1, wherein embodiments use alternative permission sets for different sets of functions as a result of dynamically changing permission sets such that different portions of the code are executed under different permission levels.

5. The system of claim 1, wherein the one or more computer-readable media further have stored thereon instructions that are executable by the one or more processors to configure the computer system to iteratively use different permission levels for the same portions of code by, for each iteration, executing different instructions in the code being executed specifying different permission sets.

6. The system of claim 1, wherein the one or more computer-readable media further have stored thereon instructions that are executable by the one or more processors to configure the computer system to identify that sufficient permissions are not included in the second permission set to perform a given function, and as a result identify the needed permission and specify the needed permission to a user.

7. The system of claim 1, wherein one or more computer-readable media further have stored thereon instructions that are executable by the one or more processors to configure the computer system to perform the following:

as actions are being performed in the execution of the code, identify which permissions are needed to perform each given action;

identify which permissions are available in the second permission set for particular actions;

identify which permissions are not available in the second permission set for particular actions; and identify to a user, a correlation of permissions to actions.

8. The system of claim 7, wherein the correlation of permissions to actions identifies which permissions are included in the second permission set and which permissions are not included in the second permission set.

9. A method of testing code, the method comprising:

beginning executing code to be tested on a computing system, wherein the code being executed on the computing system is a body of code received by the computing system, and including instructions received from a developer of the code, the instructions specifying one or more permission sets, the instructions being derived from a library that exposes functions to set built in permission sets;

executing a first portion of the code using a first permission level for permissions specified in a first permission set;

then identifying an instruction, the instruction being included in the code received from the developer being executed on the computing system, the instruction specifying a second permission set;

dynamically, as the code is running, executing the instruction having the specified second permission set, changing the computing system to a second permission level to match the specified second permission set;

executing a second portion of the code at the computing system at the second permission level, such that the code being executed on the computing system is run under different permission levels by executing permission level changing instructions in the code to be tested itself; and during execution, for an action to be performed in the execution of the code, determining if the specified second permission set includes sufficient permissions for the action to be performed.

10. The method of claim 9, further comprising determining that privileges are missing for the action to be performed, and as a result, aborting executing the code and providing an error message.

11. The method of claim 9, further comprising determining that privileges are missing for the action to be performed, but continuing executing the code as a result of determining that the action not able to be performed is not essential to continuing code execution, and adding identified missing privileges to a list that can be provided to a user.

12. The method of claim 9, wherein embodiments use alternative permission sets for different sets of functions as a result of dynamically changing permission sets.

13. The method of claim 1, further comprising iteratively using different permission levels for the same portions of code as a result of dynamically changing permission sets by, for each iteration, executing different instructions in the code being executed specifying different permission sets.

14. The method of claim 9, further comprising identifying that sufficient permissions are not included in the second permission set to perform a given function, and as a result identifying the needed permission and specifying the needed permission to a user.

15. The method of claim 9, further comprising:

as actions are being performed in the execution of the code, identifying which permissions are needed to perform each given action;

identifying which permissions are available in the second permission set for particular actions;

identifying which permission are not available in the second permission set for particular actions; and identifying to a user, a correlation of permissions to actions.

16. The method of claim 15, wherein the correlation of permission to actions identifies which permissions are included in the second permission set and which permissions are not included in the second permission set.

17. The method of claim 9, further comprising
identifying in the code a third permission set defined in the code; and
dynamically as the code is running, changing a permission level to match the third permission set.

18. A computer program product comprising:

one or more computer-readable hardware media having stored thereon instructions that are executable by one or more processors to configure a computer system to test code, including instructions that are executable to configure the computer system to perform at least the following:

- begin executing code to be tested on a computing system, wherein the code being executed on the computing system is a body of code received by the computing system, and including instructions received from a developer of the code, the instructions specifying one or more permission sets, the instructions being derived from a library that exposes functions to set built in permission sets;
- execute a first portion of the code using a first permission level for permissions specified in a first permission set;
- then identify an instruction, the instruction being included in the code received from the developer being executed on the computing system, the instruction specifying a second permission set;
- dynamically, as the code is running, execute the instruction having the specified second permission set to change the computing system to a second permission level to match the specified second permission set;
- execute a second portion of the code at the computing system at the second permission level, such that the code being executed on the computing system is run under different permission levels by executing permission level changing instructions in the code to be tested itself, and
- during execution, for an action to be performed in the execution of the code, determine if the specified second permission set includes sufficient permissions for the action to be performed.

19. The computer program product of claim 18, wherein the one or more computer-readable hardware media further have stored thereon instructions that are executable by the one or more processors to configure the computer system to determine that privileges are missing for the action to be performed, and as a result, abort executing the code and provide an error message.

20. The computer program product of claim 18, wherein the one or more computer-readable hardware media further have stored thereon instructions that are executable by the one or more processors to configure the computer system to determine that privileges are missing for the action to be performed, but continue executing the code as a result of determining that the action not able to be performed is not essential to continuing code execution, and add identified missing privileges to a list that can be provided to a user.

* * * * *